United States Patent [19]

Morris et al.

[11] Patent Number: 4,791,333

[45] Date of Patent: Dec. 13, 1988

[54] ELECTRIC LAMP WITH INTERNAL CONDUCTIVE REFLECTOR FORMING PART OF THE CIRCUITRY THEREOF

[75] Inventors: Merle E. Morris; Stephen P. Senft, both of Lexington, Ky.

[73] Assignee: GTE Products Corporation, Danvers, Mass.

[21] Appl. No.: 9,000

[22] Filed: Jan. 30, 1987

[51] Int. Cl.⁴ ............................................. H01J 1/02
[52] U.S. Cl. ..................... 313/25; 313/113; 313/313; 313/579
[58] Field of Search ................. 313/25, 313, 579, 315

[56] References Cited

U.S. PATENT DOCUMENTS

| | | | |
|---|---|---|---|
| 2,054,846 | 9/1936 | Zillger | 313/113 X |
| 2,691,120 | 10/1954 | Barber | 313/594 X |
| 2,712,095 | 6/1955 | Noel | 313/594 X |
| 3,160,777 | 12/1964 | Holcomb | 313/113 |
| 3,211,938 | 10/1965 | Holcomb | 313/113 |
| 3,418,512 | 12/1968 | T'Jampens et al. | 313/579 X |
| 3,593,060 | 7/1971 | Kryder | 313/113 X |

*Primary Examiner*—Palmer C. DeMeo
*Attorney, Agent, or Firm*—Lawrence R. Fraley; William E. Meyer

[57] ABSTRACT

An electric lamp, such as an infrared lamp, including a sealed outer envelope having a sealed end portion in which are positioned a pair of electrical conductors. Centrally positioned within the outer envelope is a sealed inner, light-transmitting envelope which includes therein a coiled tungsten filament. A pair of conductive members, coupled to the filament, project externally from opposing sealed end parts of the inner envelope. One of these projecting conductive members is electrically connected to a respective one of the electrical conductors while the other conductive member is electrically connected to the remaining conductor through the utilization of a thin, conductive molybdenum reflector which is positioned within the outer envelope adjacent the sealed, inner envelope. This reflector thus forms part of a series circuit for the invention and also functions to assist in maintaining the inner envelope at the described central position within the outer envelope, while simultaneously functioning to reflect radiant energy in the form of light and/or heat from the invention's inner envelope.

9 Claims, 2 Drawing Sheets

4,791,333

ELECTRIC LAMP WITH INTERNAL CONDUCTIVE REFLECTOR FORMING PART OF THE CIRCUITRY THEREOF

TECHNICAL FIELD

The invention relates to electric lamps and in particular to electric lamps including an internal reflector. Examples are illustrated in U.S. Pat. Nos. 3,160,777 (Holcomb) and 3,211,938 (Holcomb). In addition to these, it is also known to utilize an internal reflector lamp wherein a pair of individual filament lamps are connected electrically in series and are oriented within a rectangularly shaped outer envelope. The reflector, also rectangular in cross-section, is located substantially along one side of both individual lamps but electrically and structurally separated therefrom.

The lamp of the instant invention represents a significant improvement in the art through the utilization of an internal reflector which functions as part of the lamp's internal circuitry while also serving to reflect light from the lamp in a predetermined manner. Additionally, the reflector also functions to provide support for the lamp's light source (a sealed inner envelope having a filament structure therein) such that the source is strategically (e.g., centrally) disposed within the lamp's outer envelope (jacket). Connections to the invention are possible at only a single end thereof, thus facilitating placement (and connection) of the invention within a desired environment (e.g., fixture socket).

It is believed that a lamp possessing the aforementioned characteristics, among others, would represent a significant advancement in the art.

DISCLOSURE OF THE INVENTION

It is a primary object of the invention to enhance the electric lamp art by providing an internal reflector electric lamp possessing, among others, the advantageous features mentioned above.

It is another object of the invention to provide such a lamp which can be produced in a relatively inexpensive and expeditious manner.

Yet another object of the invention is to provide such a lamp which is compact in design and thus readily adaptable for utilization in several environments such as heating fixture sockets (e.g., as used in paint curing ovens) or the like for directing preestablished quantities of heat onto a desired surface.

In accordance with one aspect of the invention, there is provided an improved electric lamp including an outer, light-transmitting envelope having a sealed end portion, first and second electrical conductors located within the sealed end portion, a sealed, inner light-transmitting envelope located within the outer envelope and including a filament structure therein and a pair of electrically conductive members connected to the filament and projecting externally of the sealed inner envelope. A first of the conductive members is electrically joined to the first conductor located within the outer envelope's sealed end. The improvement comprises the provision of an electrically conductive reflector which is positioned within the outer envelope adjacent the inner envelope for reflecting light emitted from said inner envelope in a predetermined direction through said outer envelope. The reflector is electrically coupled to a second of the conductive members projecting from the inner envelope to the second conductor located within the sealed end portion of the outer envelope, thus providing a complete electrical circuit through the lamp.

BEST MODE FOR CARRYING OUT THE INVENTION

For a better understanding of the present invention together with other and further objects, advantages and capabilities thereof, reference is made to the following disclosure and appended claims in connection with the above-described drawings.

Figure 1:
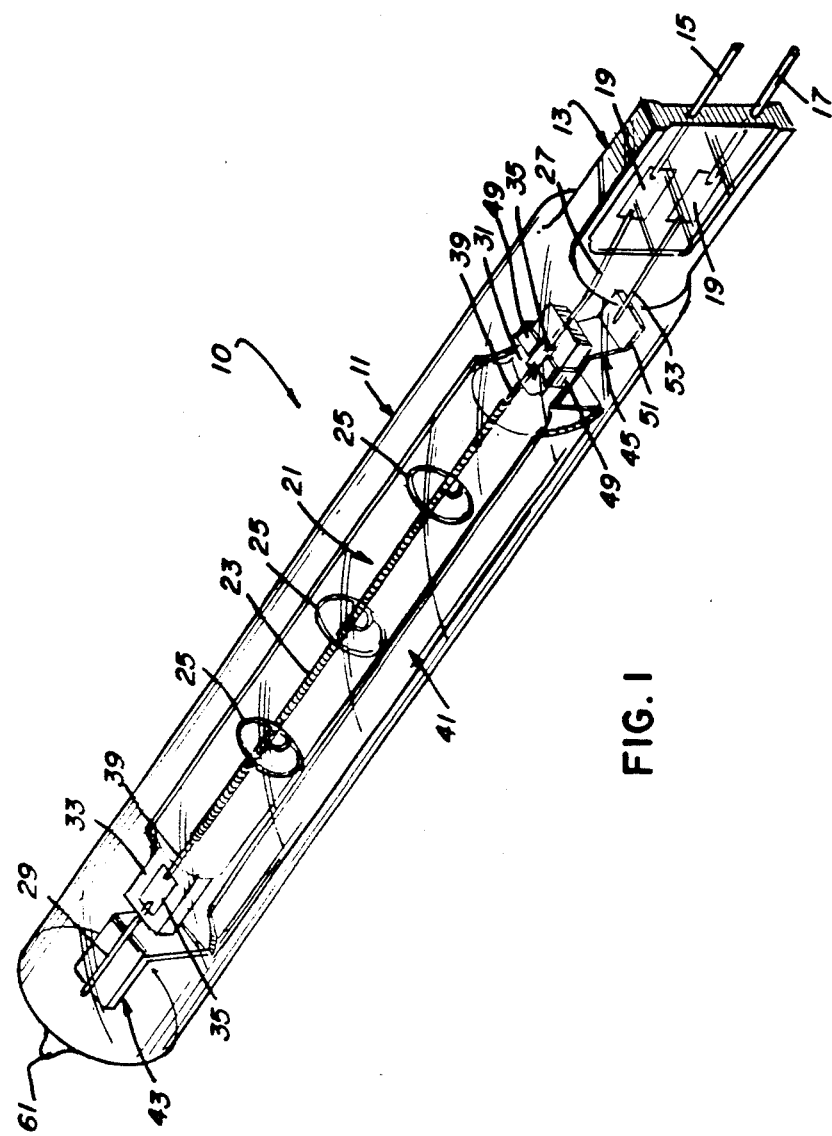
FIG. 1 is a perspective view of an electric lamp in accordance with a preferred embodiment of the invention.

In FIG. 1, there is shown an electric lamp 10 in accordance with a preferred embodiment of the invention. Lamp 10 includes an outer, light-transmitting envelope 11 having a sealed end portion 13 in which is positioned a pair of electrical conductors 15 and 17. Each of these conductors preferably comprises a molybdenum wire which projects externally of sealed end portion 13 and is connected at the other (inner) end thereof to a thin molybdenum foil 19 which is hermetically sealed within end 13. Located within outer envelope 11 is a sealed inner, light-transmitting envelope 21 which includes therein a coiled filament structure 23. In a preferred embodiment, filament structure 23 was a coiled tungsten filament and, as shown, was centrally disposed within the elongated inner envelope 21 by a plurality of coiled tungsten support wires (spacers) 25, examples of which are known in the art.

A pair of electrically conductive members 27 and 29 are electrically connected to opposing ends of the longitudinal filament 23 and project externally from opposing sealed end parts 31 and 33, respectively of the sealed inner envelope 21. Each of the conductive members 27 and 29 is also preferably a molybdenum wire which, as shown, is attached (e.g., welded) to a thin molybdenum foil element 35 respectively sealed within the opposite end part of envelope 21. Another conductive wire 39 is attached to the opposite end of each sealed molybdenum foil 35 and extends inwardly of envelope 31 to be directly connected to the respective end of the tungsten filament structure 23. This inner envelope, filament and conductive member assembly thus serves as an inner bulb (light source) for the invention.

Figure 2:
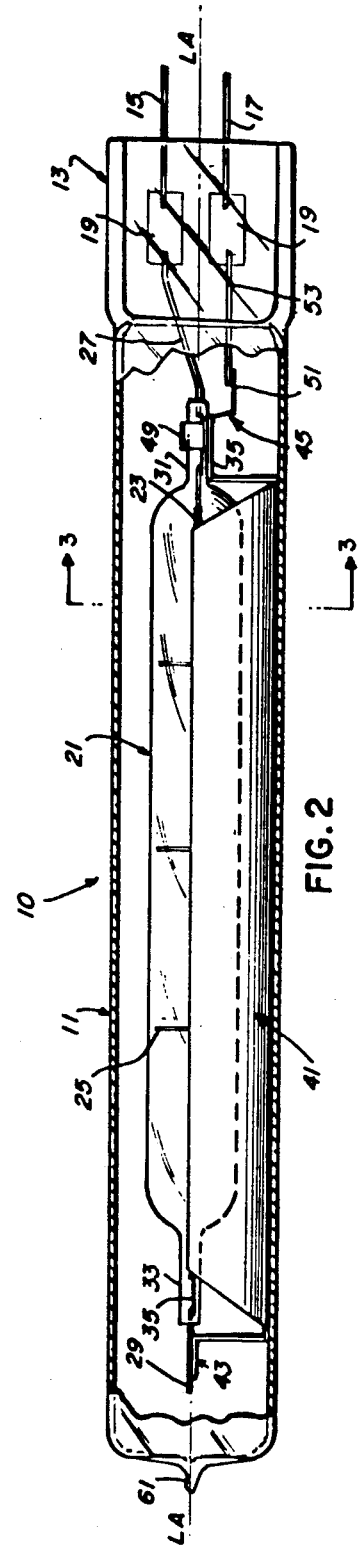
FIG. 2 is a side elevational view, partly in section, of the lamp of FIG. 1 on a larger scale.

As shown in FIG. 1, the conductive member 27 projecting externally from sealed end part 31 of the inner envelope is connected to the opposite end of the molybdenum foil element 19 secured to the first electrical conductor 15. Alternatively, an interim wire (not shown) could be secured to the opposite end of this molybdenum foil member to project internally of the outer envelope 11 and thus be directly attached (e.g., welded) to the conductive member 27. In either event, the wire (27 in FIG. 2) must be angularly bent (e.g., from about 10 to about 15 degrees) in the manner depicted to provide the necessary connection to foil 19. This is due primarily to the offset of the planar sealed end 13 relative to the corresponding planar sealed end 31 of the inner envelope and the fact that said wire substantially centrally disposed within end 31. This offsetting arrangement (approximately 90 degrees as seen in FIGS. 1 and 2) assures central disposition of inner envelope 21 such that it can be effectively secured by the illustrated design of the invention's reflector (see below). It is of course possible to modify this orientation with a corresponding modification to the reflector's design.

In a preferred embodiment, the inner envelope 21 was comprised of quartz and contained a gas mixture therein established at approximately one atmosphere. This mixture, in one embodiment, was preferably argon with a halogen (e.g., bromine) dopant. The inner envelope 21 was sealed at opposite ends thereof using a press sealing operation known in the art. In one example, the inner envelope 21, illustrated as being of substantially cylindrical configuration, possessed an outer diameter (O.D.) of only about 0.375 inch. In such an embodiment, outer envelope 11 was preferably also of quartz and possessed an outer diameter of only about 0.625 inch.

In accordance with the teachings of the invention, electric lamp 10 further includes a thin, electrically conductive reflector 41 which is positioned within outer envelope 11 adjacent the elongated inner envelope 21 and is designed for reflecting radiant energy in the form of light and/or heat from the inner envelope in a predetermined direction through outer envelope 11. In the event that electric lamp 10 is to function as a heat (e.g., infrared) lamp (e.g., to be used in a paint or similar curing oven), reflector 41 thus functions to direct this infrared radiation in the desired direction. As shown in FIGS. 1 and 2, reflector 41 includes an end section 43 which is directly connected to the conductive member 29 projecting externally from one of the sealed end parts of inner envelope 21. As seen in FIG. 2, end section 43 clearly is shown as supporting this end of the inner envelope such that it is substantially centrally disposed within outer envelope 11 so as to lie substantially along the longitudinal axis (LA—LA) of this outer, cylindrical envelope. End section 43 is preferably attached to conductive member 29 by welding. In a preferred embodiment, reflector 41 was formed of polished molybdenum and had a thickness of only about 0.003 inch. By the term thin is thus meant a thickness no greater than about 0.005 inch.

As further shown in FIG. 1 (and also FIG. 2), reflector 41 includes an opposing end section 45 which also functions to support inner envelope 21, but at the opposite end from the reflector's first end section 43. This is achieved at end section 45 through the utilization of a strap member, separate from the reflector and perhaps attached (e.g. welded) thereto, or, alternatively, a pair of clip members which are attached (e.g., welded) to or which form extensions of end section 45. These embodiments are both represented by the numeral 49 in the drawings (FIGS. 1, 2). Should a strap member be used, it is preferably of metallic material (e.g., nickel) and, as shown, is wrapped about both the part of end section 45 abutting the sealed end 31 of the inner envelope as well as said sealed end. If clips are used, whether part of or separate elements from the reflector at this portion thereof, these are also wrapped about end 31 in the manner shown. End section 45 further includes a lower extension tab 51 which also forms part of the reflector and which may rest against an inner surface of outer envelope 11 to provide added aforementioned support for the inner envelope. This arrangement, not shown in the drawings, is not essential, however, for successful support of the inner bulb as the opposite part (from tab 51) of section 45 is clearly seen as engaging the outer envelope's inner surface (FIG. 2), as does the remaining, main curvilinear body part of the reflector. Extension tab 51 is electrically connected to the end of the remaining molybdenum foil element 19 opposite the location of the connection to the second electrical conductor 17. Such connection is preferably accomplished using an interim molybdenum conducting wire 53. Although secured about end part 31 of envelope 21, this part of the reflector, as stated, is of course electrically isolated from conductive member 27.

It is thus seen that the conductive reflector 41 provides a means for electrically coupling the conductive member 29 to the second electrical conductor 17, thus providing a completed circuit through the interior of outer envelope 11. The reflector is thus electrically connected in series with the described inner bulb (light source) such that both terminal ends of this circuit are located within the common, sealed end of the invention's outer envelope. A "single-ended" lamp (one having all connections at one end) has thus been provided.

Figure 3:
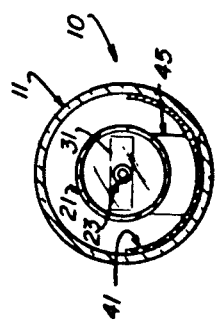
FIG. 3 is a cross-sectional view of the lamp of FIG. 1, also on an enlarged scale, as taken along the line 3—3 in FIG. 2.

As also shown in FIG. 3, the main body section of reflector 41 is of the aforementioned curvilinear (semiconductor) configuration and rests flush against an internal surface of the similarly shaped, cylindrical outer envelope 11, thus further illustrating the added support provided by reflector 41 in maintaining inner envelope 11 at the desired, substantially central position. The aforementioned completed circuit is thus provided in an expeditious manner without the need for added electrical connections or the like which would not only add to the complexity of such an arrangement but also to the cost thereof. The arrangement defined by the instant invention is thus shown to be extremely compact and relatively simple to manufacture.

EXAMPLE

In one example, an electric lamp was produced having an operational voltage of 120 volts, a wattage of about 1380 watts, and an approximate coil (filament) temperature of 2800 degrees Kelvin. A filament having a length of about 260 millimeters (mm) was used and the finished product, including end connector (not shown) possessed an overall length of about 355 mm. During operation, the outer envelope possessed a minimum bulb wall temperature of about 250 degrees Celsius (C.) and a sealed end (13) temperature of about 350 degrees C. The aforementioned outer diameter dimensions for the inner and outer envelopes were utilized for this example, as were the defined materials for the respective connections (e.g., conductors 15 and 17).

Assembly of electric lamp 10 was accomplished by first forming the inner envelope 21 having the elongated coiled tungsten filament 25 centrally disposed therein. This inner bulb was then attached to the reflector by firstly welding the end section 43 to conductive member 29 and thereafter securing the defined clip or strap members (49) about the inner bulb's opposing sealed end part (31). Conductor 53 was then welded to the extension tab 51 of end section 45. The described thin molybdenum foils 19 were then welded to the ends of the conductive members 27 and 53 and the electrical conductors 15 and 17 then were welded to opposite ends thereof. This entire assembly was then slidably positioned within the open end of a cylindrical piece of glass tubing which eventually was to form outer envelope 11. The reflector, by slidably engaging the tubing's internal surfaces, simultaneously functioned to center the contained (secured) inner envelope and conductive member assembly within the tubing. This was achieved, surprisingly, without harm to the reflector. With this assembly so positioned in a predetermined manner, sealed end portion 13 was formed using a press sealing operation known in the art to thus hermetically seal the foils 19 and respective portions of the conductors 15, 17, 27 and 53. Of significance, the aforedefined reflector-inner envelope assembly positioning facilitated alignment of the attached foils (19) and end conductors because of its relatively rigid structure, despite the sliding and other movement thereof. Sealing of end portion 13 was thus greatly facilitated. Once this sealed end portion was formed, the opposing end of the outer envelope 11, being open, was used to evacuate the envelope's interior (using a flushing operation including an inert gas such as argon) and thereafter adding an inert gas (e.g., argon) thereto. A tipping operation known in the art was then utilized to tip the opposite end of the outer envelope and thus provide a tipped section 61 (FIG. 1) thereon. Such a tipping operation is known in the art and further description is thus not believed necessary. The preferred atmosphere for the described inert gas added to outer envelope 11 was preferably at a pressure of about one atmosphere.

While there have been shown and described what are at present considered the preferred embodiments of the invention, it will be obvious to those skilled in the art that various changes and modifications may be made therein without departing from the scope of the invention as defined by the appended claims.

We claim:

1. In an electric lamp including an outer, light-transmitting envelope having a sealed end portion, first and second electrical conductors located within said sealed end portion, a sealed inner, light-transmitting envelope located within said outer envelope and including a filament structure therein and a pair of electrically conductive members connected to said filament and projecting externally of said sealed inner envelope, a first of said conductive members being electrically coupled to said first conductor within said sealed end portion of said outer envelope, the improvement comprising an electrically conductive reflector positioned within said outer envelope adjacent said inner envelope for reflecting radiant energy in the form of light and/or heat from said inner envelope in a predetermined direction through said outer envelope, said reflector electrically coupling a second of said conductive members projecting from said inner envelope to said second conductor located within said sealed end portion of said outer envelope, said reflector further including portions contacting said outer envelope to assist in maintaining said inner envelope in a predetermined position within said outer envelope.

2. The improvement according to claim 1 wherein said sealed inner envelope is substantially centrally positioned within said outer envelope.

3. The improvement according to claim 2 wherein said sealed inner envelope is of elongated configuration having opposing sealed end parts, each of said conductive members being positioned within and projecting from a respective one of said sealed end parts.

4. The improvement according to claim 3 wherein said reflector includes a pair of extending end sections, a first of said end sections being electrically connected to said second conductive member of said inner envelope and a second of said end sections being electrically connected to said second electrical conductor located within said sealed end portion of outer envelope.

5. The improvement according to claim 4 wherein said second extending end section of said reflector is secured to said sealed end part of said inner envelope having said first conductive member therein in an electrically insulated manner while providing support for said inner envelope within said outer envelope.

6. The improvement according to claim 5 wherein said second extending end section of said reflector is secured to said sealed end part of said inner envelope using a strap member, said strap member wrapped about both a part of said extending end section of said reflector and said sealed end part.

7. The improvement according to claim 5 further including a pair of clip members secured to or forming part of said extending end section of said reflector and projecting therefrom, said clip members wrapped about said sealed end part of said inner envelope.

8. The improvement according to claim 1 wherein said outer envelope is of substantially cylindrical configuration and said reflector is substantially curvilinear in cross-section, said reflector resting against an internal surface of said outer envelope.

9. The improvement according to claim 1, wherein said outer envelope is of substantially cylindrical configuration and said reflector includes portions substantially coaxial with and contacting an internal surface of said outer envelope.

* * * * *

REEXAMINATION CERTIFICATE (1228th)
United States Patent [19]
Morris et al.

[11] B1 4,791,333

[45] Certificate Issued  Mar. 27, 1990

[54] ELECTRIC LAMP WITH INTERNAL CONDUCTIVE REFLECTOR FORMING PART OF THE CIRCUITRY THEREOF

[75] Inventors: Merle E. Morris; Stephen P. Senft, both of Lexington, Ky.

[73] Assignee: GTE Products Corporation

Reexamination Request:
No. 90/001,754, Apr. 18, 1989

Reexamination Certificate for:
Patent No.: 4,791,333
Issued: Dec. 13, 1988
Appl. No.: 9,000
Filed: Jan. 30, 1987

[51] Int. Cl.⁴ ............... H01K 1/34; H01J 5/48
[52] U.S. Cl. ............................. 313/25; 313/113; 313/313; 313/579
[58] Field of Search ......... 313/25, 113, 313, 315, 313/579

[56]         References Cited
        U.S. PATENT DOCUMENTS

| | | | |
|---|---|---|---|
| 2,054,846 | 9/1936 | Zillger | 313/113 X |
| 2,691,120 | 10/1954 | Barber | 313/594 X |
| 2,712,095 | 6/1955 | Noel | 313/594 X |
| 3,160,777 | 12/1964 | Holcomb | 313/113 |
| 3,211,938 | 10/1965 | Holcomb | 313/113 |
| 3,418,512 | 12/1968 | T'Jampens et al. | 313/579 X |
| 3,593,060 | 7/1971 | Kryder | 313/113 X |

FOREIGN PATENT DOCUMENTS 494192 10/1938  United Kingdom .
2133259 7/1984  United Kingdom .

*Primary Examiner*—Palmer C. DeMeo

[57]         ABSTRACT

An electric lamp, such as an infrared lamp, including a sealed outer envelope having a sealed end portion in which are positioned a pair of electrical conductors. Centrally positioned within the outer envelope is a sealed inner, light-transmitting envelope which includes therein a coiled tungsten filament. A pair of conductive members, coupled to the filament, project externally from opposing sealed end parts of the inner envelope. One of these projecting conductive members is electrically connected to a respective one of the electrical conductors while the other conductive members is electrically connected to the remaining conductor through the utilization of a thin, conductive molybdenum reflector which is positioned within the outer envelope adjacent the sealed, inner envelope. This reflector thus forms part of a series circuit for the invention and also functions to assist in maintaining the inner envelope at the described central position within the outer envelope, while simultaneously functioning to reflect radiant energy in the form of light and/or heat from the invention's inner envelope.

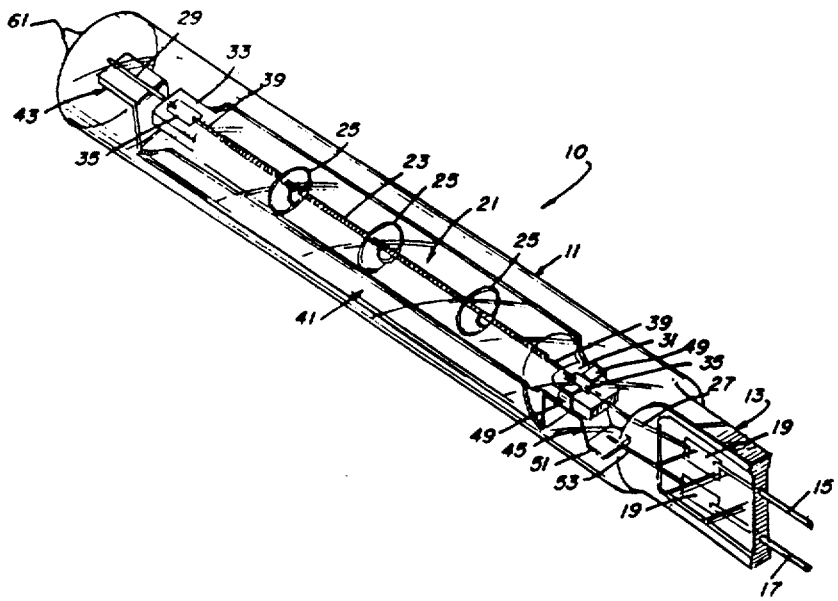

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, after line 36,
*FIGS. 1 and 2 show the main body of the single piece reflector coupled to the end section 43 by a first tabular section of the reflector extending approximately at a right angle to the main body of the reflector. The first tabular connection is additionally coupled at approximately a right angle to the end section 43. Similarly, FIGS. 1 and 2 show the main body of the reflector coupled to the end section 45 by a second tabular section of the reflector extending approximately at a right angle to the main body of the reflector. The second tabular connection is additionally coupled at approximately a right angle to the end section 45. It is clear that when the reflector is made of metal of the thickness described above, the first and second tabular sections provide some flexibility along the reflector's length with respect to the couplings made at end section 43, and end section 45.*

AS A RESULT OF REEXAMINATION, IT HAS BEEN DETERMINED THAT:

Claim 3 is cancelled.

Claims 1 and 4–7 are determined to be patentable as amended.

Claims 2, 8 and 9, dependent on an amended claim, are determined to be patentable. New claims 10–18 are added and determined to be patentable.

1. In an electric lamp including an outer, light-transmitting envelope having a sealed end portion, first and second electrical conductors located within said sealed end portion, [a sealed] *an* inner, light-emitting, *elongated* envelope *having opposite sealed ends,* located within said outer envelope, and including a filament structure therein and a pair of electrically conductive members connected to said filament and projecting externally [of said sealed inner envelope] *from the opposite sealed ends,* a first of said conductive members being electrically coupled to said first conductor within said sealed end portion of said outer envelope, the improvement comprising an *elongated* electrically conductive reflector positioned within said outer envelope adjacent said inner envelope for reflecting radiant energy in the form of light and/or heat from said inner envelope in a predetermined direction through said outer envelope, said reflector electrically coupling a second of said conductive members projecting from said inner envelope to said second conductor located within said sealed end portion of said outer envelope, said reflector further including portions contacting said outer envelope [to assist in] *and a pair of extensions at opposite ends thereof for supporting, near the opposite ends of the inner envelope, the combination of said inner envelope, said filament structure, and said electrically conductive members and* maintaining said inner envelope in a predetermined position within said outer envelope.

4. The improvement according to claim [3] *1* wherein [said reflector includes a pair of extending end sections,] a first of said [end sections being] *extensions is* electrically connected to said second conductive member of said inner envelope and a second of said [end sections being] *extensions is* electrically connected to said second electrical conductor located within said sealed end portion of *said* outer envelope.

5. The improvement according to claim 4 wherein said second [extending end section of said reflector] *extension* is secured to said sealed end [part] of said inner envelope [having said first conductive member therein] in an electrically insulated manner while providing support for said inner envelope within said outer envelope.

6. The improvement according to claim 5 wherein said second [extending end section of said reflector] *extension* is secured to said sealed end [part] of said inner envelope using a strap member, said strap member wrapped about both a part of said [extending end section of said reflector] *second extension* and said sealed end [part].

7. The improvement according to claim 5 further including a pair of clip members secured to or forming part of said [extending end section of said reflector] *second extension* and projecting [thereform] *therefrom,* said clip members wrapped about said sealed end [part] of said inner envelope.

*10. The improvement according to claim 1 wherein a first end of the inner envelope is press sealed and is supported along the press seal by one of said extensions from the reflector.*

*11. The improvement according to claim 1 wherein a coupling mechanically couples one of the extensions of the reflector to one of the sealed ends of the inner envelope.*

*12. The improvement according to claim 1 wherein one of the sealed ends of the inner envelope is supported along one of said conductive members extending from the inner envelope by one of the extensions of the reflector.*

*13. The improvement according to claim 12 wherein at least a section of said contacting portions of said reflector is flexible.*

*14. The improvement according to claim 1 wherein the reflector with the supporting extensions and contacting portions comprise a single piece construction.*

*15. The improvement according to claim 1 wherein the reflector provides sufficient support for the inner envelope to allow the inner envelope and reflector to be slidably positioned in the outer envelope during assembly.*

*16. The improvement according to claim 1 wherein the outer envelope seal is a press seal with a substantially planar orientation, parallel with an inner envelope axis defined by the inner envelope ends, and an adjacent seal of the inner envelope is a press seal with a substantially planar orientation parallel with the inner envelope axis and transverse to the outer press seal by approximately 90°.*

*17. The improvement according to claim 1 wherein at least a section of one of said supporting extensions for the inner envelope is approximately at a right angle to the reflector.*

*18. The improvement according to claim 1 wherein at least a section of one of the supporting extensions for the inner envelope is a flexible metal coupling.*

* * * * *